US011545919B2

(12) United States Patent
Ono et al.

(10) Patent No.: US 11,545,919 B2
(45) Date of Patent: Jan. 3, 2023

(54) DRIVING CIRCUIT AND DRIVING METHOD OF FAN MOTOR, COOLING DEVICE AND ELECTRONIC APPARATUS USING THE FAN MOTOR

(71) Applicant: ROHM CO., LTD., Kyoto (JP)

(72) Inventors: Mitsuho Ono, Kyoto (JP); Tsubasa Sakurai, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/538,284

(22) Filed: Nov. 30, 2021

(65) Prior Publication Data

US 2022/0173679 A1 Jun. 2, 2022

(30) Foreign Application Priority Data

Dec. 2, 2020 (JP) .............................. JP2020-200587

(51) Int. Cl.
*G11B 19/28* (2006.01)
*H02P 6/20* (2016.01)
*H02P 6/16* (2016.01)
*H02P 5/74* (2006.01)
*H02K 9/00* (2006.01)

(52) U.S. Cl.
CPC ................ *H02P 6/20* (2013.01); *H02K 9/00* (2013.01); *H02P 5/74* (2013.01); *H02P 6/16* (2013.01)

(58) Field of Classification Search
CPC ........ H02P 6/20; H02P 5/74; H02P 6/21; H02P 6/16; G11B 19/28
See application file for complete search history.

(56) References Cited

U.S. PATENT DOCUMENTS 5,466,999 A * 11/1995 Hutsell .................... H02P 6/21
                                                           318/431
2001/0006331 A1* 7/2001 Shibata ................. G11B 19/28
                                                           318/560

FOREIGN PATENT DOCUMENTS

JP                 2015035852 A       2/2015

* cited by examiner

*Primary Examiner* — Cortez M Cook
(74) *Attorney, Agent, or Firm* — Cantor Colburn LLP (57) ABSTRACT

The present disclosure provides a driving circuit of a fan motor to shorten a start time. The driving circuit drives the fan motor with a sensor. A control logic circuit controls an inverter circuit connected to the fan motor according to a Hall signal that indicates a position of a rotor of the fan motor. When the driving circuit is given an instruction to start a rotation, if the fan motor rotates at a speed lower than a predetermined rotational speed, the drive circuit starts the fan motor by sequentially switching between a second state in which the rotor is fixed at an initial position, a third state in which the fan motor is forcibly and synchronously started, and a fourth state in which the fan motor is Hall-driven.

20 Claims, 11 Drawing Sheets

DRIVING CIRCUIT AND DRIVING METHOD OF FAN MOTOR, COOLING DEVICE AND ELECTRONIC APPARATUS USING THE FAN MOTOR

CROSS REFERENCE TO RELATED APPLICATIONS

The present invention claims priority under 35 U.S.C. § 119 to Japanese Application No. 2020-200587 filed Dec. 2, 2020, the entire content of which is incorporated herein by reference.

TECHNICAL FIELD

The disclosure relates to a driving technique for a fan motor.

BACKGROUND

A fan motor used for temperature control is mounted on a laptop computer or desktop computer, an information processing apparatus such as a workstation, an entertainment program machine such as a gaming machine, a projector or a monitoring camera, a home appliance such as a microwave or a refrigerator, or a vehicle. A fan motor directly blows a heat source such as a central processing unit (CPU), draws fresh air from outside to inside of a casing, or discharges heated air.

A fan motor is a mostly brushless motor. A fan motor can be categorized into a motor with a sensor such as a Hall element, or a sensorless motor without a sensor.

PATENT PUBLICATION

[Patent publication 1] Japan Patent Publication No. 2015-35852

SUMMARY

Problems to be Solved by the Disclosure

The applicants of the disclosure discussed with respect to starting of a fan motor, and have come to known the following task based on the results of the discussion. At the moment of the beginning of the actuation, it is possible that a fan motor be idling or reversing, in addition to being in a state of being stopped. Thus, when a fan motor starts, the state of the motor needs to be determined, and be started according to a corresponding start order determined. As a result, a conventional fan motor may have a longer start time.

The disclosure is completed in view of the task above, and it is an object of an embodiment of the disclosure to provide a driving circuit of a fan motor to shorten the start time.

Technical Means for Solving the Problem

The disclosure provides a driving circuit or driving method of a fan motor. A Hall signal indicating a position of a rotor of the fan motor is generated. When an instruction for starting a rotation occurs, (a) if the fan motor substantially stops, a transition is made in order of first to fourth states below to start the fan motor: a first state, in which an output of a bridge circuit connected to the fan motor is set to a high impedance state; a second state, in which an output of each phase of the bridge circuit is fixed in a predetermined state; a third state, in which an output state of each phase of the bridge circuit is switched in a predetermined order at a predetermined time interval; and a fourth state, in which an output state of each phase of the bridge circuit is switched in a predetermined order in synchronization with the Hall signal. Moreover, (b) if the fan motor rotates at a speed lower than a predetermined rotational speed, a transition is made in order of the first state, a fifth state in which an output of the bridge circuit is set to a high impedance state, the second state, the third state, and the fourth state to start the fan motor. Moreover, (c) if the fan motor rotates at a speed higher than the predetermined rotational speed, a transition is made in order of the first state, the fifth state, and the fourth state to start the fan motor.

In the disclosure, in addition to mounting or embedding the sensor to the fan motor, the sensor may also be configured in vicinity of the fan motor or be built in a driving circuit.

Moreover, any combination of the constituent elements above, or mutual replacements or substitutions of the constituent elements or expressions among the method, device or system of the disclosure are to be considered as effective implementations of the disclosure.

Effects of the Disclosure

The start time of a fan motor can be shortened according to an embodiment of the disclosure.

DETAILED DESCRIPTION OF THE EMBODIMENTS

A summary of several embodiments of the disclosure are given below. The summary serves as the preamble of the detailed description to be given shortly, and aims to provide fundamental understanding of the embodiments by describing several concepts of one or more embodiments in brief. It should be noted that the summary is not to be construed as limitation to the scope of the disclosure. Moreover, the summary does not encompass all conceivable and possible embodiments, and do not provide specific definitions for essential constituent elements of the embodiments. For illustration purposes, it is possible that the term "an/one embodiment" be used to refer to one embodiment (implementation form or variation example) or a plurality of embodiments (implementation forms or variation examples).

A driving circuit according to an embodiment drives a fan motor with a sensor. The driving circuit includes a control logic circuit, which controls a bridge circuit connected to the fan motor according to a Hall signal that indicates a position of a rotor of the fan motor. The control logic circuit is switchable to one of first to fifth states below: a first state, in which an output of the bridge circuit is set to a high impedance state; a second state, in which an output of each phase of the bridge circuit is fixed in a predetermined state; a third state, in which an output state of each phase of the bridge circuit is switched in a predetermined order at a predetermined time interval; a fourth state, in which an output state of each phase of the bridge circuit is switched in a predetermined order in synchronization with the Hall signal; and a fifth state, in which an output of the bridge circuit is set to a high impedance state. When the control logic circuit gives an instruction to the drive circuit to start a rotation: (a) if the fan motor substantially stops, a transition is made in order of the first state, the second state, the third state, and the fourth state; (b) if the fan motor rotates at a speed lower than a predetermined rotational speed, a transition is made in order of the first state, the fifth state, the second state, the third state, and the fourth state; and (c) if the fan motor rotates at a speed higher than the predetermined rotational speed, a transition is made in order of the first state, the fifth state, and the fourth state.

According to the configuration, the motor slowly idles forward at starting, and when a transition is made in order of the first state and the fifth state, a transfer is made to a normal driving period according to the Hall signal, that is, the fourth state, after the second state and the third state. Accordingly, by slowly idling forward, the start time can be shortened compared to control of returning to the first state after the fan motor temporarily stops.

When the control logic circuit is (i-1) in the first state and when a variation of the Hall signal is not detected within a predetermined first time, a transition to the second state is made, and (i-2) when a variation of the Hall signal is detected within the predetermined first time, a transition to the fifth state is made.

When the control logic circuit is (ii-1) in the fifth state and when a time interval of a variation in the Hall signal is shorter than a predetermined second time, a transition to the fourth state is made, and (ii-2) when it is not the above situation, a transition to the second state is made.

When the control logic circuit is (iii-1) in the second state and when the Hall signal maintains at an expected state for a third time, a transition to the third state is made.

When the control logic circuit is (iv-1) in the third state and when the Hall signal satisfies a predetermined condition, a transition to the fourth state is made.

The predetermined condition includes a first condition that an output state of the bridge circuit has been switched a predetermined number of times.

The driving circuit may further include a back electromotive force detection circuit, which generates a back electromotive force detection signal based on a counter electromotive force of the fan motor. The predetermined condition may also include a second condition that a phase difference between the Hall signal and the back electromotive force detection signal is equal to or less than a predetermined value.

The second time may be configured to be set externally. By optimizing the second time, the same driving circuit is enabled to correspond to various fan motors of different characteristics.

The driving circuit may further include a setting pin for receiving a setting voltage indicating the second time.

Besides the first state to the fifth state, the control logic circuit is switchable to the sixth state of fixing the output of each phase of the bridge circuit to a same level, and when the control logic circuit is (iii-2) in the second state and when the Hall signal maintains an unexpected state for a fourth time, or when the Hall signal has been switched a predetermined number of times, a transition to the sixth state is made.

The driving circuit may further include a bridge circuit.

The driving circuit may be integrated on a semiconductor substrate. The term "integrated" includes a situation where all constituent elements of a circuit are formed on a semiconductor substrate, and a situation where main constituent elements of a circuit are integrated. Alternatively, some resistors or capacitors may be arranged outside the semiconductor substrate in order to adjust circuit constants. By integrating a circuit on a chip, the circuit area is reduced and characteristics of circuit elements may be kept uniform.

EMBODIMENTS

Preferred embodiments are described with the accompanying drawings below. The same or equivalent elements, components or processes shown in the drawings are assigned with the same denotations, and repeated description is appropriately omitted. It should be noted that the embodiments are non-limiting examples of the disclosure, and all features or combinations thereof described in the embodiments are not necessarily essentials of the disclosure.

In the description of the application, an expression "a state of component A connected to component B" includes, in addition to a situation where component A and component B are directly connected, a situation where component A is indirectly connected to component B via another component, and the indirect connection does not result in substantial influences on their electrical connection or does not impair functions or effects exerted by their connection.

Similarly, an expression "a state of component C arranged between component A and component B" includes, in addition to a situation where component A and component C, or component B and component C are directly connected, an indirect connection via another component, and the indirect connection does not result in substantial influences on their electrical connection or does not impair functions or effects exerted by their connection.

Figure 1:
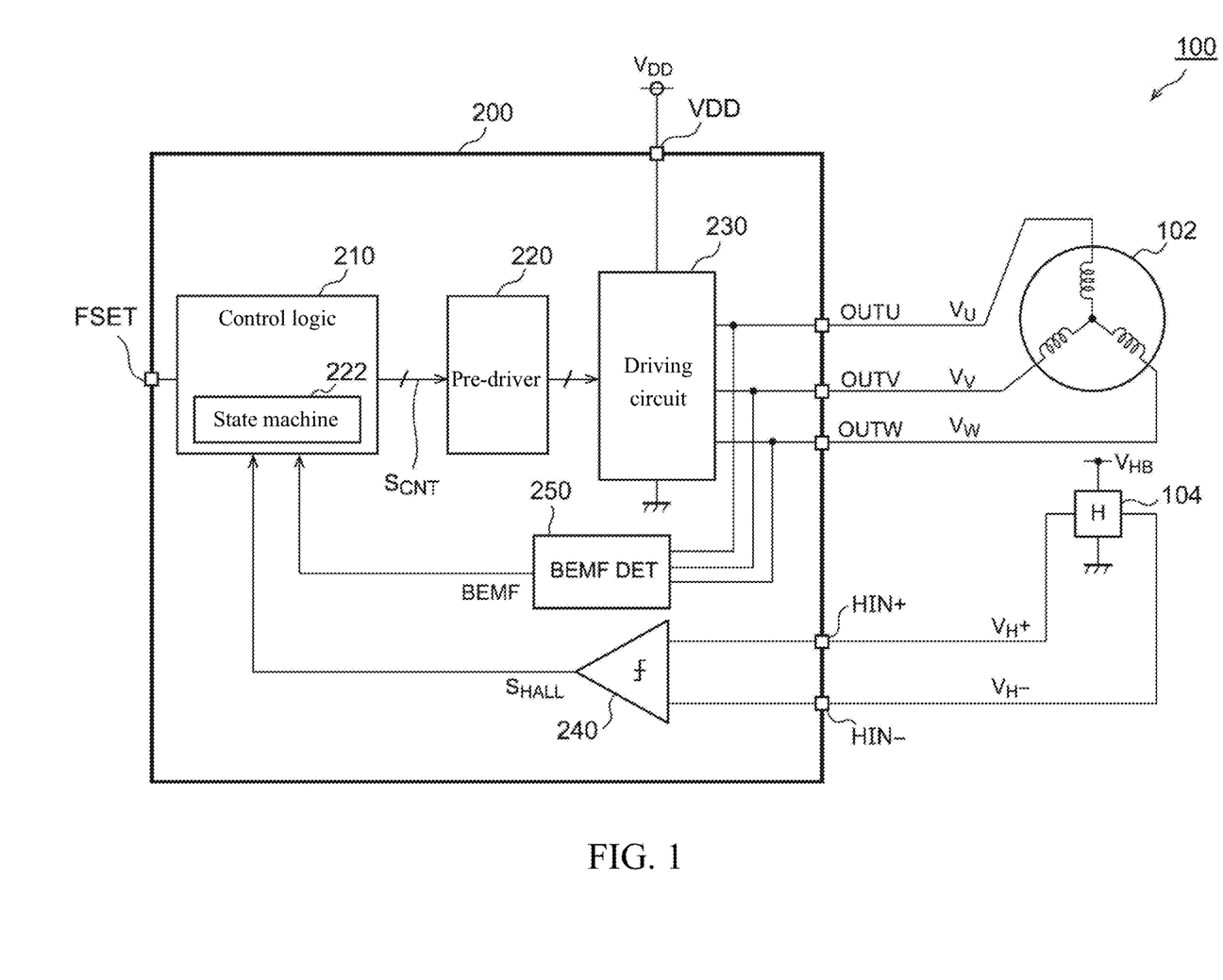
FIG. 1 is a circuit diagram of a driving circuit of a fan motor according to an embodiment.

FIG. 1 shows is a circuit diagram of a driving circuit 200 of a fan motor according to an embodiment. The driving circuit 200 drives a fan motor 102. The fan motor 102 is a three-phase brushless direct-current (DC) motor, that is, a motor mounted with one Hall sensor of one Hall element 104. A Hall bias voltage $V_{HB}$ generated by the driving circuit 200 or another power supply circuit is provided to the Hall element 104. The Hall element 104 outputs a pair of Hall voltages $V_{H+}$ and $V_{H-}$ indicating a position of a rotor of the fan motor 102.

The driving circuit 200 includes a U-phase output OUTU, a V-phase output OUTV and a W-phase output OUTW connected to U-phase, V-phase and W-phase coils of the fan motor 102. The driving circuit 200 further includes Hall input terminals HIN+ and HIN− receiving the Hall voltages $V_{H+}$ and $V_{H-}$. An output OUT# (where #=U, V or W) of each phase may adopt a high (H), low (L) or high-impedance (HiZ) state. The high H is not limited to being at fixed high, and may include a state having undergone pulse width modulation (PWM).

The driving circuit 200 includes a control logic circuit 210, a pre-driver 220, an inverter circuit 230, a Hall comparator 240, a back electromotive force detection circuit 250, and is integrated on a semiconductor substrate. The term "integrated" includes a situation where all constituent elements of a circuit are formed on a semiconductor substrate, and a situation where main constituent elements of a circuit are integrated. Alternatively, some resistors or capacitors may be arranged outside the semiconductor substrate in order to adjust circuit constants.

A power supply voltage VDD from an external power supply (not shown) is supplied to a power (VDD) terminal of the driving circuit 200.

The Hall comparator 240 compares the Hall voltages $V_{H+}$ and $V_{H-}$ and generates a Hall signal $S_{HALL}$ indicating a magnitude relationship. The Hall signal $S_{HALL}$ transitions each time the Hall voltages $V_{H+}$ and $V_{H-}$ intersect.

The back electromotive force detection circuit 250 generates a back electromotive flux (BEMF) signal based on voltages $V_U$ to $V_W$ outputted by the U-phase output, the V-phase output and the W-phase output. For example, the back electromotive force detection circuit 250 may compare an intermediate voltage $V_{COM}$ of the voltages $V_U$ to $V_W$ with at least one output voltage ($V_U$, $V_V$ and $V_W$) to generate the BEMF signal. The intermediate voltage $V_{COM}$ may also be generated by a resistance network formed by a star connection of the $V_U$, $V_V$ and $V_W$ of the three phases. Moreover, during back electromotive force detection, a window for detection is opened, and an output of the inverter circuit 230 is set to a high impedance state within the window.

The control logic circuit 210 generates a control signal $S_{CNT}$ controlling a state of the inverter circuit 230 according to the Hall signal $S_{HALL}$ and the BEMF signal. For example, the control logic circuit 210 may generate the control signal $S_{CNT}$ by means of 120° energization or 180° energization (or 150° energization). The control logic circuit 210 may also scale up or scale down a duty factor of the PWM control of the fan motor 102 according to targeted rotational speed of the fan motor 102 or the temperature of the cooling target of the fan motor 102.

The pre-driver 220 drives the inverter circuit 230 according to the control signal $S_{CNT}$ generated by the control logic circuit 210. The inverter circuit 230 is a three-phase inverter, and includes a U-phase pin, a V-phase pin and a W-phase pin. The U-phase pin includes an upper phase arm UH and a low phase arm UL, the V-phase pin includes an upper phase arm VH and a lower phase arm VL, and the W-phase pin includes an upper phase arm WH and a lower phase arm WL. When the upper phase arm #H is connected and the lower phase arm #L is disconnected, the output OUT# is high; when the upper phase arm #H is disconnected and the lower phase arm #L is connected, the output OUT# is low; when both the upper phase arm #H and the lower phase arm #L are disconnected, the output OUT# becomes high impedance.

The control logic circuit 210 is switchable to one of a first state φ1 to a seventh state φ7. The first state φ1 to the seventh state φ7 are managed by a state machine 222.
First State φ1

In the first state φ1, the control logic circuit 210 sets the outputs OUTU, OUTV and OUTW of the inverter circuit 230 to high impedance (HiZ). The first state φ1 is used for determining idling.
Second State φ2

In the second state φ2, the control logic circuit 210 fixes each of the outputs OUTU, OUTV and OUTW of the phases of the inverter circuit 230 to a predetermined state. The predetermined state is not limited, and is OUTU=H, OUTV=L and OUTW=H in one example. The second state φ2 is for fixing a position of a rotor of which the position is uncertain to a predetermined position (referred to as an initial position), and is also referred to as an initial position fixing interval.
Third State φ3

In the third state φ3, the control logic circuit 210 switches each of the outputs OUTU, OUTV and OUTW of the phases of the inverter circuit 230 in a predetermined order at a predetermined time interval, that is, unassociated with the Hall signal $S_{HALL}$. The third state φ3 is also referred to as a forced synchronization start interval. In the forced synchronization start interval, a change may be made to a transition of the outputs OUTU, OUTV and OUTW of the three phases by means of 120° energization or 180° energization.
Fourth State φ4

In the fourth state φ4, the control logic circuit 210 is synchronous with Hall signal $S_{HALL}$, that is, synchronous with a rotation of the rotor, and switches the states of the outputs OUTU, OUTV and OUTW of the phases of the inverter circuit 230 in a predetermined order. The fourth state φ4 is also referred to an interval for stabilizing the rotation of the fan motor 102, that is, a Hall driving interval. In the fourth state φ4, the outputs OUTU, OUTV and OUTW of the three phases are controlled by means of 120° energization or 180° energization.

In 120° energization, a coil (driving phase) supplying a driving current is switched (directional control) in synchronization with the Hall signal $S_{HALL}$.

In 180° energization, the driving phase (directional control) is switched according to the Hall signal $S_{HALL}$. Moreover, in 180° energization, waveform data SINU to SINW for sine wave drive is generated according to the rotational speed of the fan motor 102, and PWM control of the inverter circuit 230 is performed according to the waveform data SINU to SINW.
Fifth State φ5

In the fifth state φ5, similar to the first state φ1, the control logic circuit 210 sets the outputs OUTU, OUTV and OUTW of the inverter circuit 230 to high impedance.
Sixth State φ6

In the sixth state φ6, the control logic circuit 210 fixes the outputs of OUTU, OUTV and OUTW of the phases of the inverter circuit 230 to the same level (for example, all to a low level). When a motor is locked due to an alien object caught in the fan motor, there is a concern that an overly large current may flow through the coil or the semiconductor element in a way that the reliability of the components may be damaged. To react in response to the issue above, the sixth state φ6 corresponds to a lock protection interval in which energization of the coil of the motor is suspended when the motor stops.
Seventh State φ7

In the seventh state φ7, similar to the sixth state φ6, the control logic circuit 210 fixes the outputs of OUTU, OUTV and OUTW of the phases of the inverter circuit 230 to the same level (for example, all to a low level). The seventh state ϕ7 corresponds to a braking interval in which idling of the rotor is forcibly stopped when the fan motor starts.

Figure 2A:
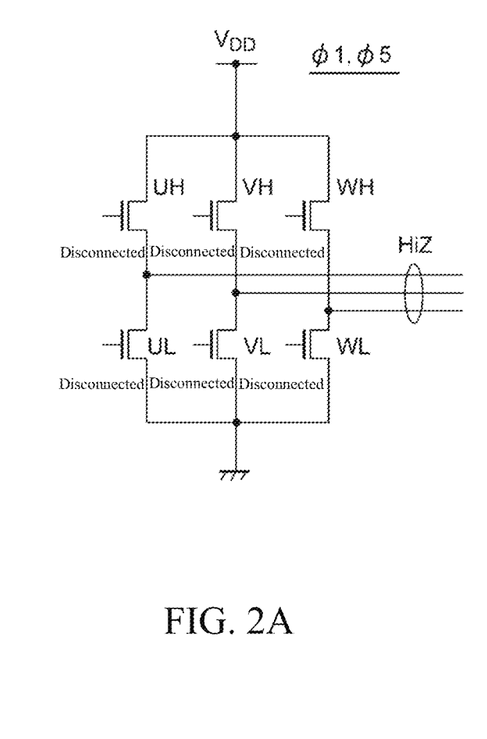
FIG. 2A to FIG. 2C are diagrams of states of an inverter circuit.
Figure 2B:
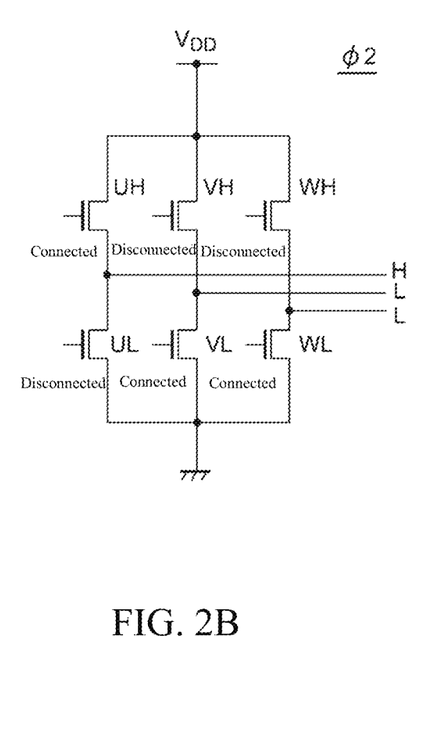
Figure 2C:
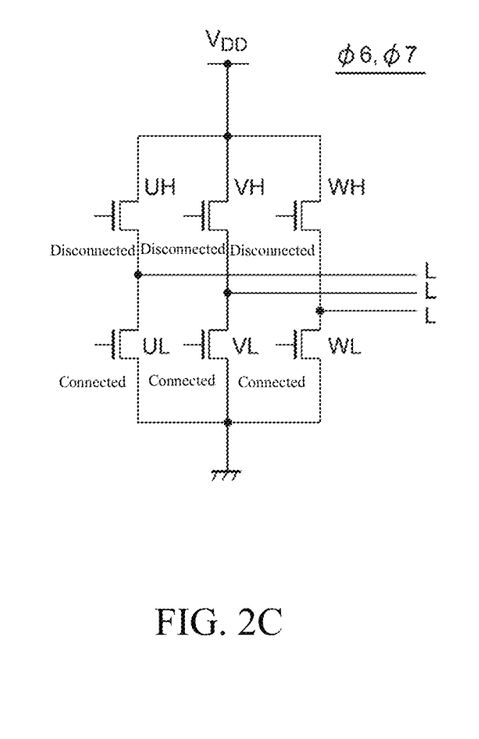

FIG. 2A to FIG. 2C show diagrams of states of the inverter circuit 230. FIG. 2A shows the first state ϕ1 and the fifth state ϕ5, FIG. 2B shows the second state ϕ2, and the FIG. 2C shows the sixth state ϕ6 and the seventh state ϕ7.

The state control of the inverter circuit 230 in the third state ϕ3 and the fourth state ϕ4 can be determined according to a driving method.

Figure 3:
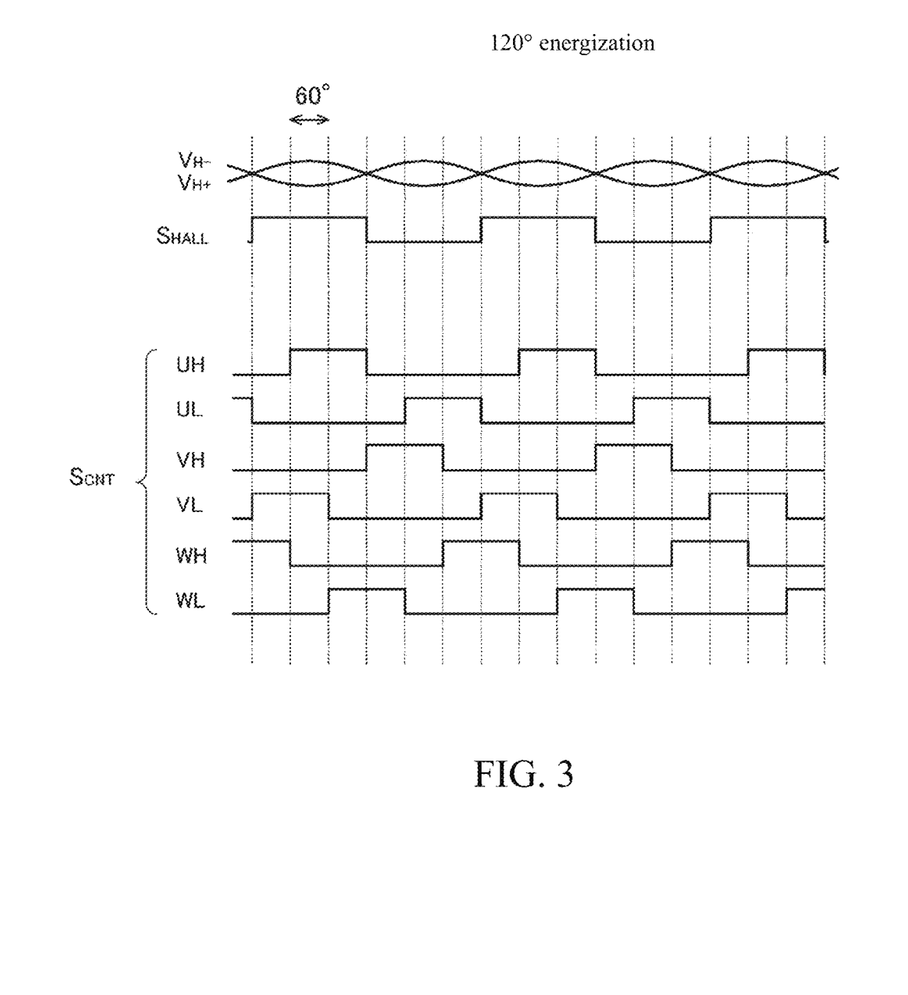
FIG. 3 is a diagram of a control signal generated in a fourth state in 120° energization.

FIG. 3 shows a diagram of control signals generated in the fourth state (Hall driving interval) ϕ4 in 120° energization. For the third state ϕ3, the variation in the state of the inverter circuit 230 is made according to the same order. Moreover, the phase of the Hall signal $S_{HALL}$ is determined according to a mounting position of the Hall element 104.

Figure 4:
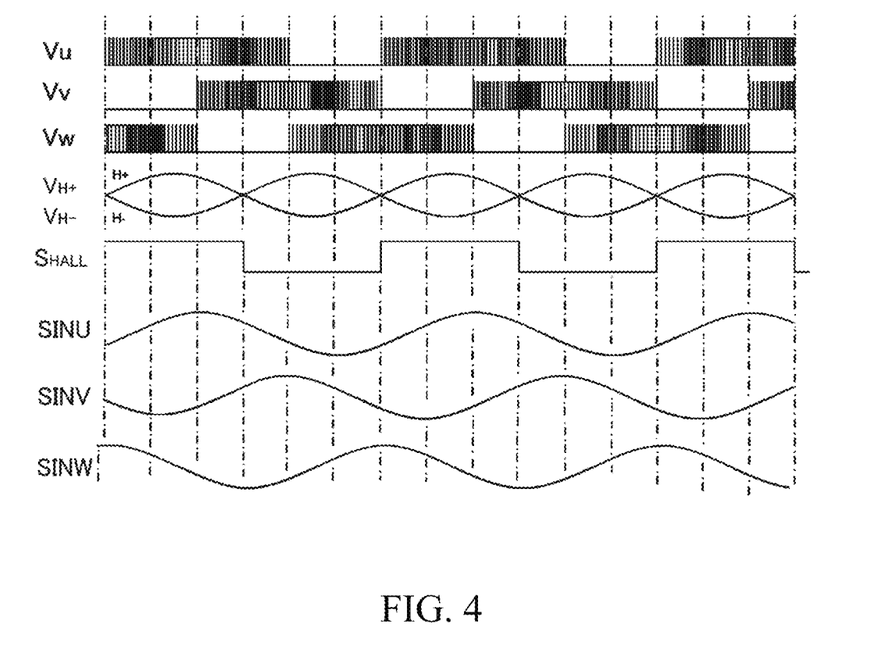
FIG. 4 is a diagram of a control signal generated in a fourth state in 180° energization.

FIG. 4 shows a diagram of control signals generated in the fourth state (Hall driving interval) ϕ4 in 180° energization. Herein, although ideal sine waves are show as the waveform data SINU to SINW, the waveform may vary based on the modulation scheme (two-phase modulation or three-phase modulation). In two-phase modulation, for example, sine waves with two peaks are sometimes used. In addition, simplified trapezoidal waves or stepped waves may be used in substitution to sine waves.

As shown in FIG. 4, a period of each set of the waveform data SINU to SINW needs to coincide with a period of the Hall signal $S_{HALL}$, and information associated with the current rotational speed of the motor is needed when the waveform data SINU to SINW is generated. For example, the control logic circuit 210 may generate the waveform data SINU to SINW in a time unit of a 60° electrical angle. In this case, the control logic circuit 210 may obtain the time of a 60° electrical angle as rotational speed information indicating the rotational speed of the fan motor 102, and may generate the waveform data SINU to SINW by using a time scale corresponding to the rotational speed information. Moreover, the waveform data SINU to SINW may be also be generated based on the BEMF signal.

Accordingly, in 180° energization, it is necessary to generate driving waveform SINU to SINW of the period corresponding to the rotational speed of the fan motor 102. In an acceleration process of the motor, even if the rotational speed (period) of a certain moment is detected, the rotational speed of the motor at the next moment may be different from the rotational speed measured at the previous moment, such that control may be unstable. Thus, in the third state ϕ3 in which the fan motor 102 accelerates, 120° energization may be used, and then 180° energization may be used after transition to the fourth state ϕ4 is made.

In this embodiment, a starting order is switched according to the state of the fan motor 102 at starting of the fan motor 102, that is, when an instruction is given to the driving circuit 200 to start a rotation. The instruction for starting a rotation may be providing a power supply, or may be an activation acknowledge signal.

(a) When an instruction is given to the driving circuit 200 to start a rotation and when the fan motor 102 substantially stops, a transition is made in order of the first state ϕ1, the second state ϕ2, the third state ϕ3 and the fourth state ϕ4 to start the fan motor 102. The state of being substantially stopped is a state below a predetermined rotational speed threshold $f_1$ set near zero, in other words, a state where a period (a full period or a half period) τ of the Hall signal $S_{HALL}$ is longer than a predetermined threshold $T_1$. $τ_1$ is a threshold proportional to the reciprocal of $f_1$.

(b) When an instruction is given to the driving circuit 200 to start a rotation and when the fan motor 102 rotates at a speed higher than the predetermined rotational speed $f_1$ and lower than a predetermined rotational speed $f_2$, in other words, when the period (a full period or a half period) of the Hall signal $S_{HALL}$ is shorter than the predetermined threshold $τ_1$ and longer a predetermined threshold $τ_2$, a transition is made in order of the first state ϕ1, the fifth state ϕ5, the second state ϕ2, the third state ϕ3 and the fourth state ϕ4 to start the fan motor 102. $τ_2$ is a constant proportional to the reciprocal of $f_2$, and a relation $τ_2 < τ_1$ is established.

(c) When an instruction is given to the driving circuit 200 to start a rotation and when the fan motor 102 rotates at a speed higher than the predetermined rotational speed $f_2$, in other words, when the period τ (a full period or a half period) of the Hall signal $S_{HALL}$ is shorter than the predetermined threshold $τ_2$, a transition is made in order of the first state ϕ1, the fifth state ϕ5 and the fourth state ϕ4 to start the fan motor 102.

Figure 5:
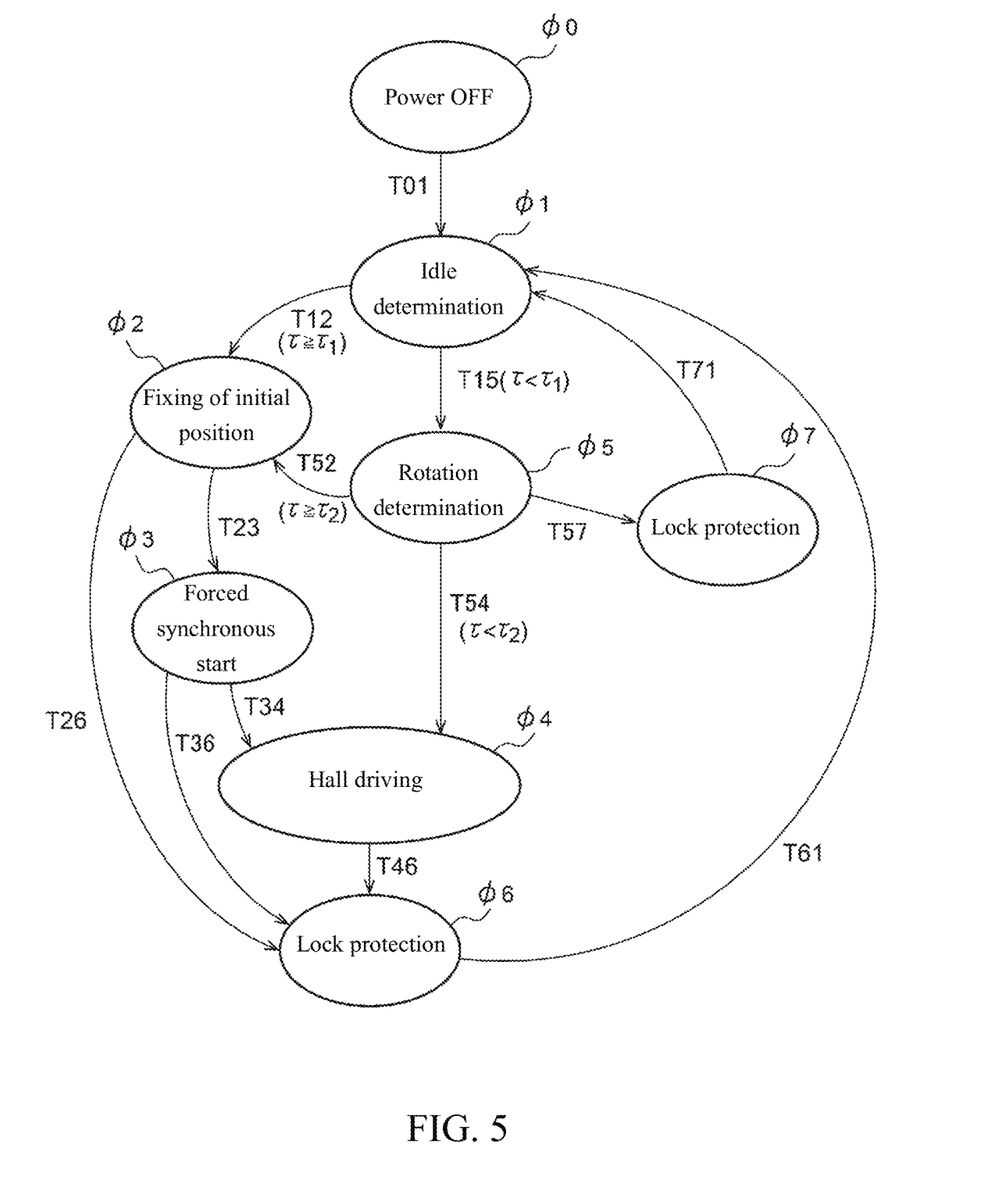
FIG. 5 is a diagram of a state transition of a control logic circuit.

FIG. 5 shows a diagram of a state transition of the control logic circuit 210. The circuit is in a stopped state ϕ0 before a power supply is provided. If the power supply is provided, the stopped state ϕ0 transitions to the first state ϕ1 (T01). Txy represents a transition from a state ϕx to a state ϕy.

Closely after the power supply is provided, there is a possibility that the fan motor 102 may stop or even idle. Thus, closely following the first state ϕ1 after the power supply is provided, idling determination is performed. More specifically, the outputs of all the three phases of the inverter circuit 230 are set to high impedance, and the Hall signal $S_{HALL}$ is monitored. If the fan motor 102 stops completely, the Hall signal $S_{HALL}$ stays at high or low, and no level transition (that is, an edge) is made.

The control logic circuit 210 (i-1) monitors the Hall signal $S_{HALL}$, and when no transition (that is, an edge) of the Hall signal $S_{HALL}$ is detected within a period of a first predetermined time $τ_1$ (for example, 100 ms), in other words, when a half period τ of the Hall signal $S_{HALL}$ is longer than the threshold $ϕ_1$, it is considered that fan motor 102 substantially stops, and a transition to the second state ϕ2 is made (T12).

When the control logic circuit 210 is the first state ϕ1, and (i-2) when an interval of a variation in the Hall signal $S_{HALL}$, that is, when the half period τ, is shorter than the first time $τ_1$ (τ<$τ_1$), a transition to the fifth state ϕ5 is made (T15). According to the processing, for example, when $τ_1$=100 ms and in case of a four-pole motor, it is determined that an idling state is present when the rotational speed f is higher than $f_1$=150 rpm (f>$f_1$), and a stopped state is present when rotational speed f is lower than $f_1$=150 rpm (f≤$f_1$). To suppress the influence of noise, the control logic circuit 210, in the first state ϕ1, may also transition to the fifth state ϕ5 when it is detected a plurality of number of times (M≥2, for example, M=2) that the interval of the first time $τ_1$ is shorter than the variation in the Hall signal $S_{HALL}$.

As described above, in an initial state, when the fan motor 102 stops, a transition is made in order of the second state ϕ2, the third state ϕ3 and the fourth state ϕ4.

More specifically, in the second state ϕ2, a combination of the outputs OUTU to OUTW applied to the fan motor 102 is fixed. In the state above, the position of the rotor of the fan motor 102 is fixed at a target initial position corresponding to the combination of the outputs, and at this point, the Hall signal $S_{HALL}$ is expected to adopt an appropriate level corresponding to the target initial position.

When the control logic circuit (210) is (iii-1) in the second state (ϕ2) and the Hall signal $S_{HALL}$ maintains an expected state for a third time T3, a transition to the third state ϕ3 is made (T23). Conversely, (iii-2) when the Hall signal $S_{HALL}$ does not stabilize at the expected state (for example, high), a transition is made to the sixth state ϕ6. The control logic circuit 210 may transition to the sixth state ϕ6 when the Hall signal $S_{HALL}$ maintains an unexpected state (a reverse logic of the expected state, for example, low) for a fourth time $\tau_4$, or when Hall signal $S_{HALL}$ has been switched a predetermined number of times. For example, $\tau_4$ may be about 1 s.

If it is determined that the rotor has moved to the target initial position, a transition to the third state ϕ3 is made. Closely following the transition to the third state ϕ3, the fan motor 102 does not rotate, and the Hall signal $S_{HALL}$ adopts a fixed level, and so driving in synchronization with the $S_{HALL}$ cannot be performed. Thus, in the third state ϕ3, the state (driving phase) of the inverter circuit 230 is switched at a predetermined time interval unassociated with the Hall signal $S_{HALL}$. In the third state ϕ3, when a predetermined condition is satisfied, a transition to the fourth state ϕ4 is made (T34).

The predetermined condition may be defined according to a method capable of detecting that the fan motor has started to rotate correctly (successfully started). For example, the control logic circuit 210 may also transition to the fourth state ϕ4 when the states of the outputs of the inverter circuit 230 have been switched a predetermined number of times (for example, 28 times), or a phase difference between the Hall signal $S_{HALL}$ and the BEMF signal is less than a predetermined value.

In the third state ϕ3, when an actuation of the fan motor 102 fails, a transition to the sixth state ϕ6 is made. For example, the control logic circuit 210 may determine that the actuation has failed and then transition to the sixth state ϕ6 when the variation in the Hall signal $S_{HALL}$ is not detected within a period in which a predetermined time (such as 1s) has elapsed from the transition to the second state ϕ2.

If the fan motor 102 actuates successfully, a transition to the fourth state ϕ4 is made, and the periodical Hall signal $S_{HALL}$ can be observed. Thus, the control logic circuit 210 controls the fan motor 102 in synchronization with the Hall signal $S_{HALL}$.

Moreover, in the fourth state ϕ4, if the rotational speed f of the fan motor 102 is lower than a low-speed threshold (a locked state) or is higher than a high-speed threshold, a transition to the sixth state ϕ6 (T46) is made to implement lock protection. After a predetermined protection time (for example, 5 s) has elapsed from the transition to the sixth state ϕ6, returning to the first state ϕ1 is performed.

Figure 6:
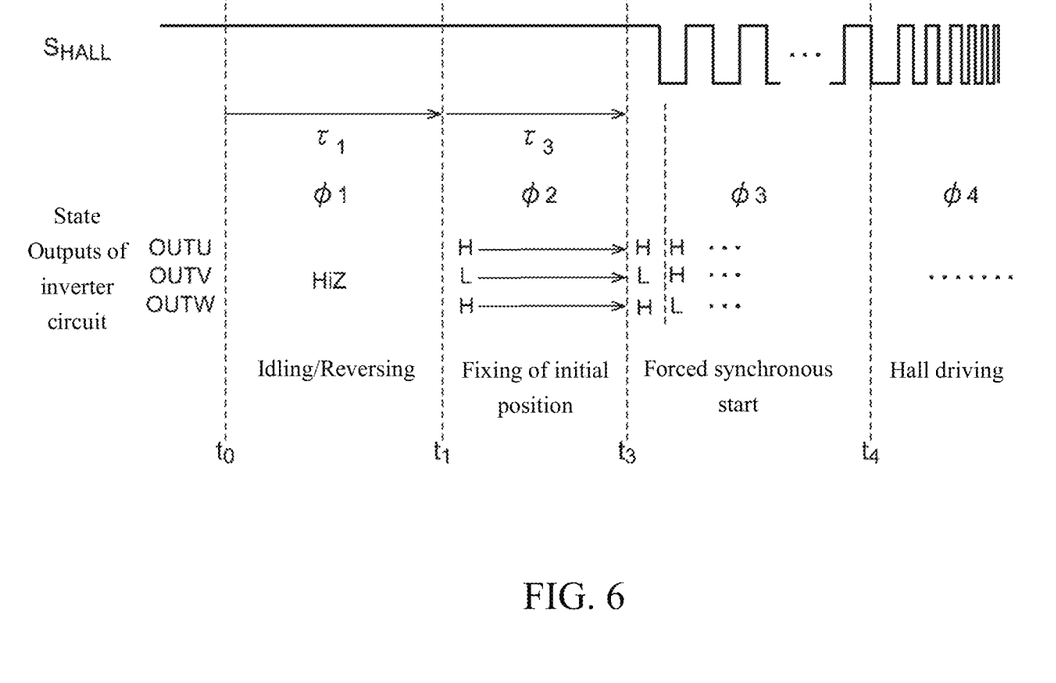
FIG. 6 is a timing diagram when a rotation of a fan motor stops at the time of the beginning of starting.

FIG. 6 show a timing diagram when a rotation of a fan motor 102 stops at the time of the beginning of starting.

When a power supply is provided at a timing $t_0$, such is regarded as an instruction for starting, and the control logic circuit 210 transitions to the first state ϕ1. Because the fan motor 102 stops, the Hall signal $S_{HALL}$ maintains a fixed level. If the Hall signal $S_{HALL}$ does not vary throughout the first time $\tau_1$, a transition to the second state ϕ2 is made at a timing $t_1$.

In the second state ϕ2, if the outputs of the inverter circuit 230 are fixed at predetermined states (for example, the U-phase and W-phase are high and the V-phase is low), the rotor moves to the position corresponding to the states. If the Hall signal $S_{HALL}$ maintains an expected state for the third time τ3, a transition to the third state ϕ3 is made at a timing $t_3$.

In the third state ϕ3, a time variation occurs in the outputs of the inverter circuit 230. Accordingly, the fan motor 102 starts rotating, and the Hall signal $S_{HALL}$ also starts to vary.

At a fourth timing $t_4$, if it is detected that the fan motor 102 actuates successfully, a transition to the fourth state ϕ4 is made. Moreover, the state of the inverter circuit 230 is switched in synchronization with the Hall signal $S_{HALL}$, and the rotational speed f of the fan motor 102 increases to a target value.

The description above illustrates the operations when a rotation of the fan motor 102 stops at the time of the beginning of starting. Next, referring to FIG. 5, operations when the fan motor 102 idles at the time of the beginning of starting are described below.

As described above, if the fan motor 102 idles, a transition is made to the fifth state ϕ5.

In the fifth state ϕ5, it is determined whether the speed f of the fan motor 102 in the idle state is lower or higher than the rotational speed $f_2$. The rotational speed $f_2$ is higher than the rotational speed $f_1$, and may be set to approximately 400 rpm, for example.

Moreover, in the idle state, when the fan motor 102 rotates at a speed lower than $f_2$ ($f<f_2$), that is, when the period T (a full period or a half period) of the hall signal $S_{HALL}$ is longer than the threshold $\tau_2$, a transition is made to the second state ϕ2 (T52). The subsequent transition is as described above.

In the idle state, when the fan motor 102 rotates at a speed higher than $f_2$ ($f>f_2$), that is, when the period T (a full period or a half period) of the hall signal $S_{HALL}$ is shorter than the threshold $\tau_2$, a transition is made directly to the fourth state ϕ4, with the second state ϕ2 and the third state ϕ3 being skipped.

For example, when the control logic circuit 210 is (ii-1) in the fifth state ϕ5 and when the period (for example, an interval between a negative edge and a negative edge, or an interval between a positive edge and a positive edge) of the Hall signal $S_{HALL}$ is shorter than the predetermined second time $\tau_2$, a transition to the fourth state ϕ4 may be made, and (ii-2) when it is not the above situation, a transition to the second state ϕ2 is made. For example, for a four-pole motor and when $\tau_2$=5 ms, $f_2$=400 rpm. To suppress the influence of noise, the control logic circuit 210, in the fifth state ϕ5, may also transition to the fifth state ϕ5 when it is detected a plurality of successive number of times (for example, three times) that the interval of the second time $\tau_2$ is shorter than the variation in the Hall signal $S_{HALL}$.

In the fifth state ϕ5, when the fan motor 102 idles in a reverse rotation, a transition to the seventh state ϕ7 is made (T57). The determination for the reverse rotation may be determined according to a phase correlation between the Hall signal $S_{HALL}$ and the BEMF signal.

In the seventh state ϕ7, braking is applied to the fan motor 102. After a predetermined braking time (for example, 5 s) has elapsed from the transition to the seventh state ϕ7, returning to the first state ϕ1 is performed (T71).

Figure 7:
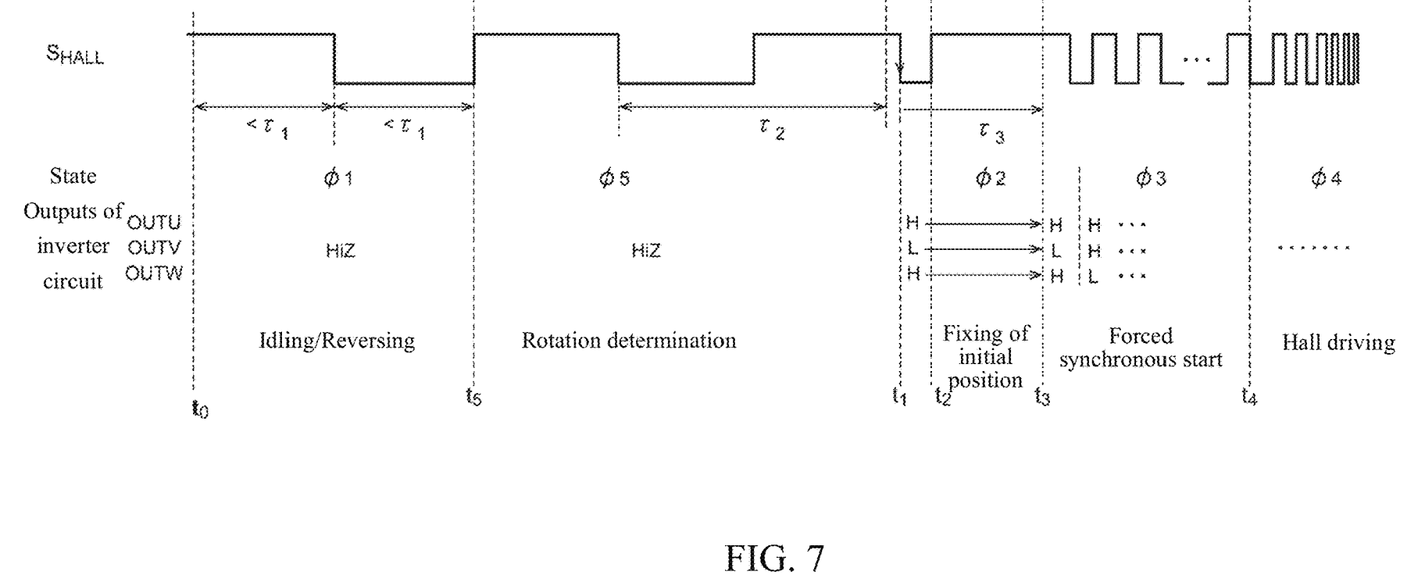
FIG. 7 is a timing diagram when a fan motor idles at a speed lower than a rotational speed at the beginning of starting.

FIG. 7 shows a timing diagram when a rotation of the fan motor 102 is idle at a speed lower than the rotational speed $f_2$ at the beginning of starting. Starting is performed in the first state ϕ1 at the timing to. After the transition to the first state ϕ1, if it is detected M number of times (for example, twice) that the time interval of the variation in the Hall signal $S_{HALL}$ is shorter than the first time ϕ$_1$, a transition to the fifth state ϕ5 (at a timing $t_5$) is made. At the timing $t_1$, if it is detected that the period of the Hall signal $S_{HALL}$ is longer than the second time $\tau_2$, a transition to the second state ϕ2 is made. The subsequent process is the same as that of FIG. 6.

Figure 8:
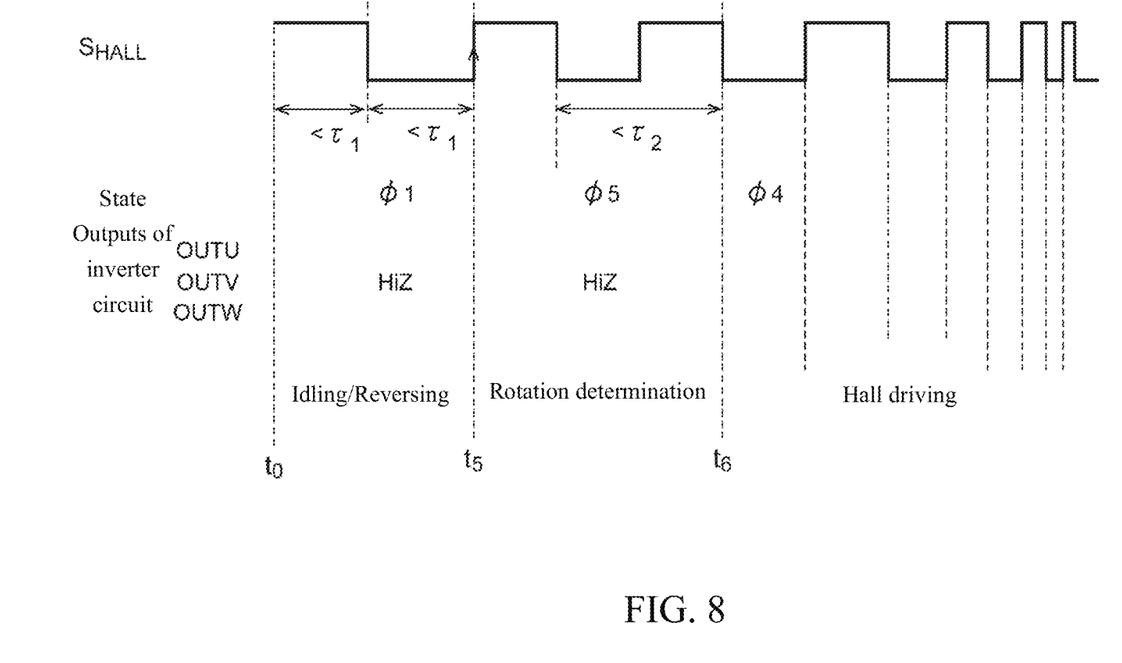
FIG. 8 is a timing diagram when a fan motor idles at a speed higher than a rotational speed at the beginning of starting.

FIG. 8 shows a timing diagram when the fan motor 102 idles at a speed higher than the rotational speed $f_2$ at the beginning of starting. Starting is performed in the first state ϕ1 at the timing to. After the transition to the first state ϕ1, if it is detected M number of times (for example, twice) that the time interval of the variation in the Hall signal $S_{HALL}$ is shorter than the first time $\phi_1$, a transition to the fifth state $\phi5$ (at a timing $t_5$) is made.

In the fifth state $\phi5$, if it is detected that the period of the Hall signal $S_{HALL}$ is shorter than the second time $\tau_2$, a transition to the fourth state $\phi4$ (at a timing $t_6$) is made. Herein, a situation where transition to the fourth state $\phi4$ is made when it is detected once that the period of the Hall signal $S_{HALL}$ of one cycle is shorter than $\tau_2$ is given as an example; however, preferably, a condition for a transition to the fourth state $\phi4$ may be set as when such detection successfully occurs throughout a plurality of cycles (for example, three cycles).

After the timing $t_6$, the control signal $S_{CNT}$ is generated in synchronization with the Hall signal $S_{HALL}$ to control the inverter circuit 230.

An order for starting the driving circuit 200 is as described above. The corresponding advantages are described below. The advantages of the driving circuit 200 can become readily apparent via a comparison with the prior art.

In comparison technique 1, when a fan motor rotates in idle at a speed lower than $f_2$, a transition to the sixth state $\phi6$ is made. In this case, after the fan motor 102 stops in the sixth state $\phi6$, the starting in the first state $\phi1$ is repeated. Thus, in comparison technique 1, a time at least longer than the protection time (for example, 5 s) is needed to actuate the fan motor 102.

In comparison technique 2, when a fan motor rotates in idle at a speed lower than $f_2$, a transition to the seventh state $\phi7$ is made, the fan motor 102 stops in the seventh state $\phi7$, and the starting in the first state $\phi1$ is repeated. Thus, in comparison technique 2, a time at least longer than the braking time (for example, 5 s) is needed to actuate the fan motor 102.

In contrast, in the embodiment, when a fan motor rotates in idle at a speed lower than $f_2$, the fan motor 102 does not stop and a transition directly to the second state $\phi2$ is made. Therefore, compared to the comparison techniques, the start time can be significantly shortened.

Discussions on various motors with different characteristics were made by the applicants, and it is acknowledged that, in the control of the embodiment, the focus is the setting of the threshold $f_2$ of the rotational speed which is referred in the fifth state $\phi5$. That is, the situation below is present—in a combination of a fan motor of a predetermined characteristic, when $f_2=400$ rpm, the starting in the second state $\phi2$ is successful; however, in a combination of a fan motor of other characteristics, if it is set that $f_2=400$ rpm, the starting in the second state $\phi2$ fails. Thus, the driving circuit 200 is configured such that the rotational speed $f_2$ may be set externally according to the characteristics and type of the fan motor 102 that is a driving target.

For example, the driving circuit 200 includes a setting pin FSET for setting the rotational speed $f_2$, in other words, the second time $\tau_2$. The control logic circuit 210 sets the rotational speed $f_2$ according to an electrical state of the pin FSET. For example, an analog voltage may be externally applied to the setting pin FSET, and the control logic circuit 210 sets and selects the rotational speed $f_2$ according to the voltage level of the setting pin FSET.

Alternatively, a high/low 2-value digital signal may also be externally inputted to the setting pin FSET. In this case, the control logic circuit 210 sets the rotational speed $f_2$ according to a logic level of the pin FSET.

Alternatively, the driving circuit 200 may also include an Inter-IC (I²C) interface or a Serial Peripheral Interface (SPI), so as to set rotational speed $f_2$ via accessing an external buffer.

Since the rotational speed $f_2$ can be set externally, the same driving circuit 200 can be used to correspond to various motors of different characteristics, hence enhancing versatility. For example, if the driving circuit 200 is purchased and a designer of a cooling device 100 wishes to modify the fan motor 102, such can be completed by merely modifying the rotational speed $f_2$ without having to change the driving circuit 200.

Moreover, when the fan motor 102 rotates in idle at a rotational speed f higher than $f_2$, high-speed starting can be performed by directly transitioning to the fourth state $\phi4$.

The embodiments are described as above. It is understandable to a person skilled in the art that, the embodiments are examples, a combination of the constituent elements or processes may include various variation examples, and these variation examples are to be encompassed within the scope of the disclosure. Some variation examples are described below.

First Variation Example

Figure 9:
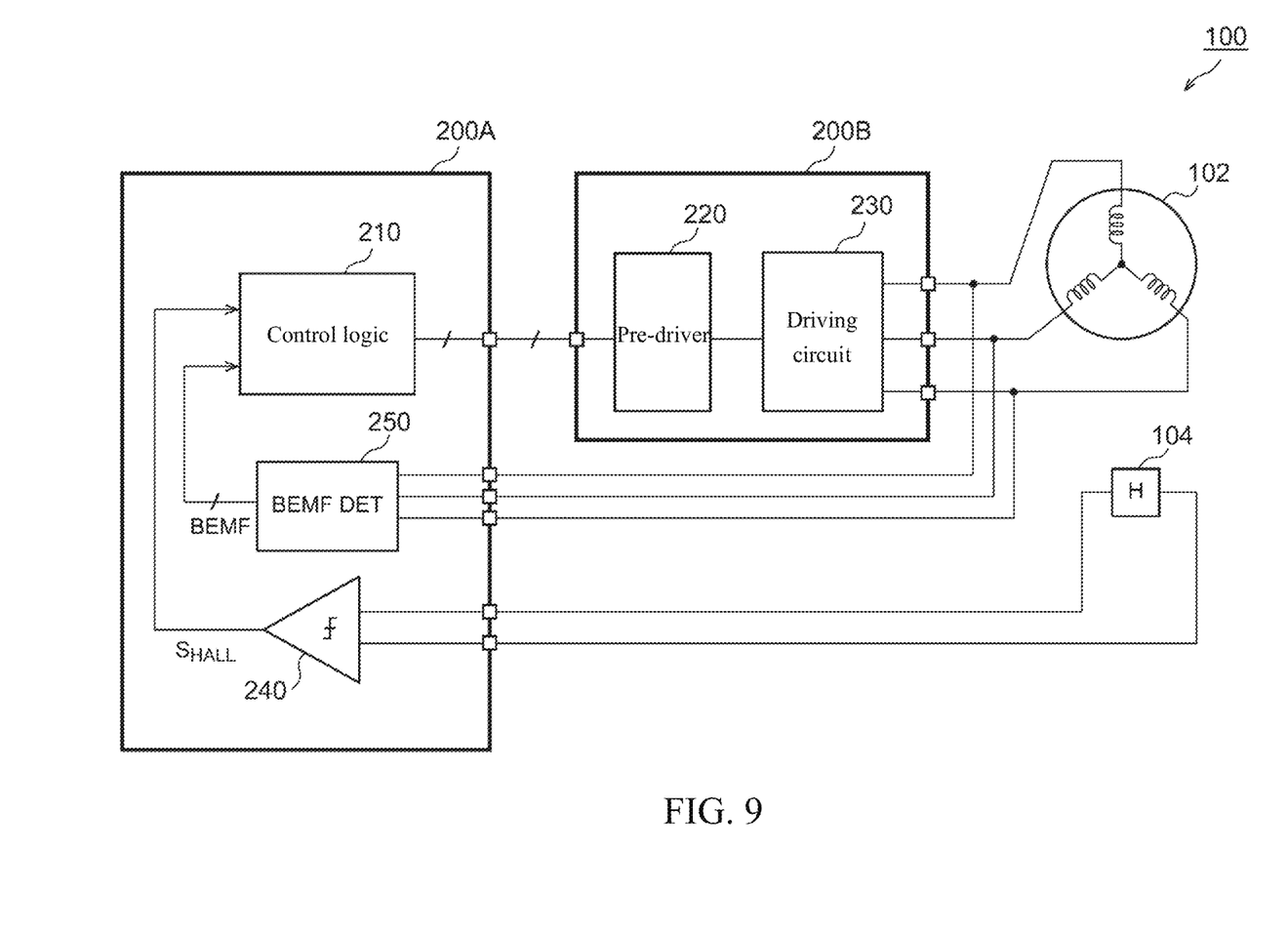
FIG. 9 is a circuit diagram of a driving circuit of a first variation example.

FIG. 9 shows a circuit diagram of a driving circuit 200A of a first variation example. In the first variation example, the driving circuit 200A includes a control logic circuit 210, a Hall comparator 240, a back electromotive force detection circuit 250, and is configured as an integrated circuit different from a driving circuit 200B including a pre-driver 220 and an inverter circuit 230.

Second Variation Example

Figure 10:
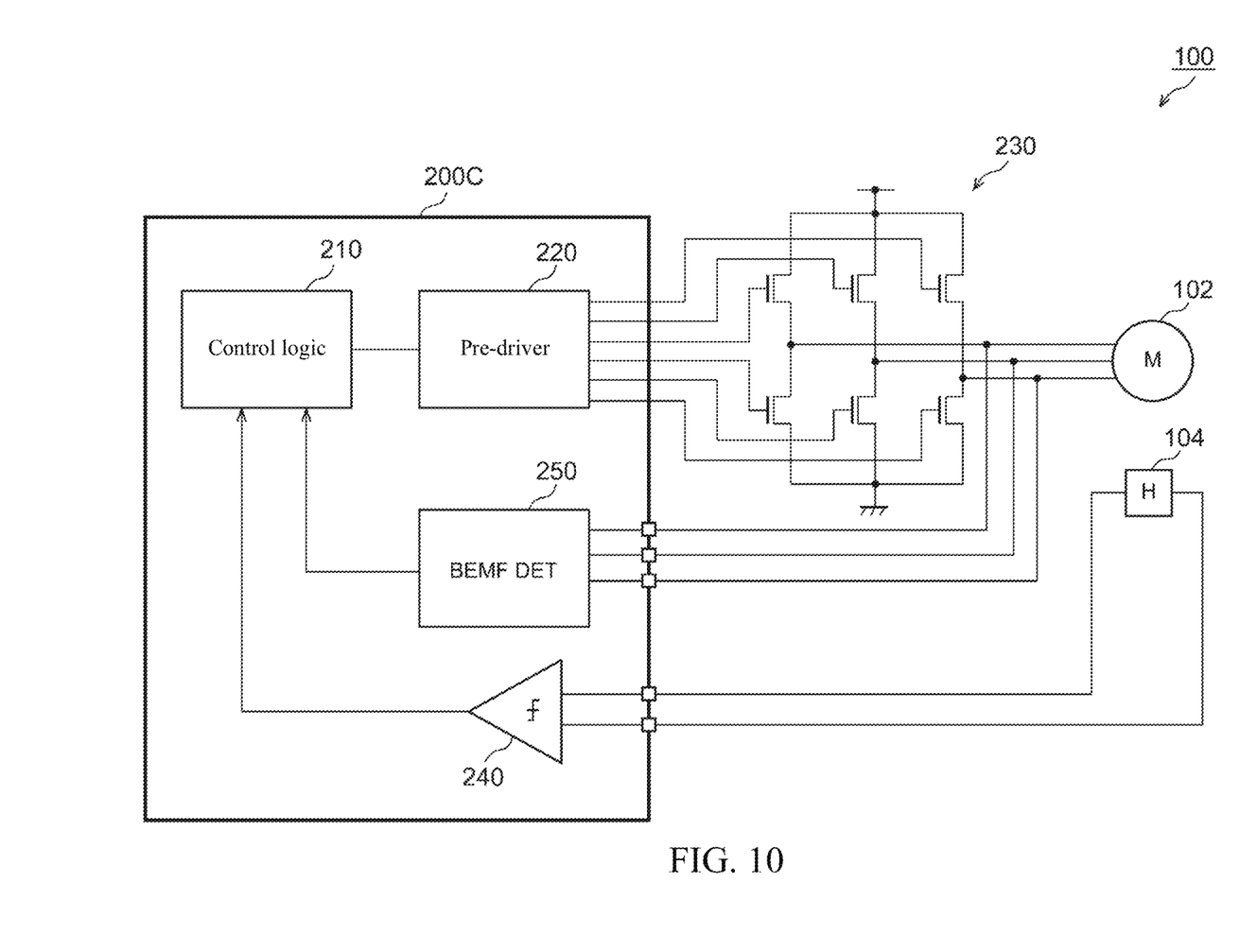
FIG. 10 is a circuit diagram of a driving circuit of a second variation example.

FIG. 10 shows a circuit diagram of a driving circuit 200C of a second variation example. In the second variation example, the driving circuit 200C includes a control logic circuit 210, a Hall comparator 240, a back electromotive force detection circuit 250 and a pre-driver 220. The inverter circuit 230 is arranged as a discrete part outside the driving circuit 200C.

Third Variation Example

In the embodiments, although a fan motor with one Hall element is given as an example, the disclosure is also applicable to a fan motor with three Hall elements.

Figure 11:
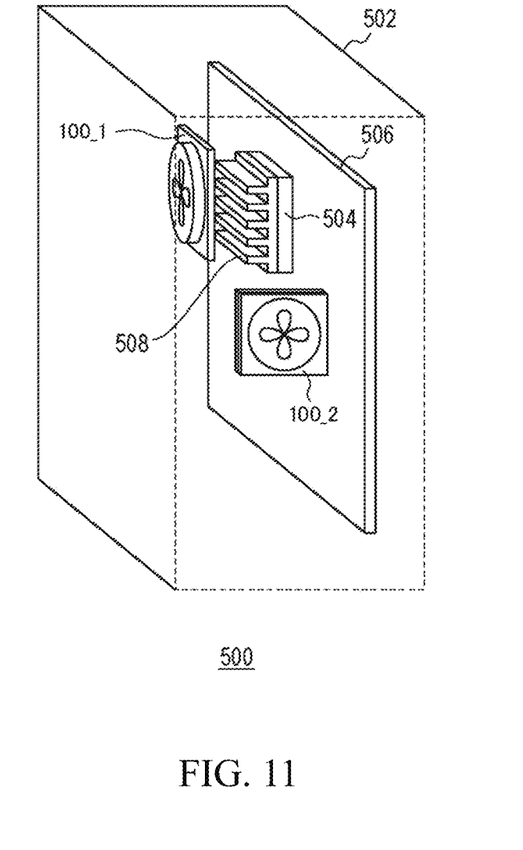
FIG. 11 is a three-dimensional diagram of a computer having a cooling device.

Lastly, the purpose of the driving circuit 200 is described below. FIG. 11 show a three-dimensional diagram of a computer having a cooling device 100. The cooling device 100 includes a fan motor 102, and the driving circuit 200 of FIG. 1. The computer 500 includes a casing 502, a CPU 504, a motherboard 506, a heat sink 508, and a plurality of cooling devices 100_1 and 100_2.

The CPU 504 is mounted on the motherboard 506. The heat sink 508 is sealed and connected on an upper surface of the CPU 504. The cooling device 100_1 is arranged opposite to the heat sink 508, and blows air toward the heat sink 508. The cooling device 100_2 is arranged on a back surface of the casing 502, and draws air outside the casing 502 to the inside, or discharges internal air to the outside.

In the embodiment, the cooling device 100 is capable of starting the fan motor 102 within a short time, and can thus quickly cool a cooling target.

In addition to the computer 500 in FIG. 11, the cooling device 110 may also be mounted on various electronic machines such as workstations, laptop computers, television and refrigerators.

Moreover, the purpose of the driving circuit 200 of the embodiments is not limited to driving a fan motor, and may be used to drive other types of motors.

The embodiments described in specific terms are for representing the principles and applications of the disclosure, and modifications to the variation examples or configurations of the embodiments can be made without departing from the scope of the concept of the disclosure accorded with the appended claims.

The invention claimed is:

1. A drive circuit, which is the drive circuit of a fan motor with a sensor, comprising:
 a control logic circuit, controlling a bridge circuit connected to the fan motor based on a Hall signal that indicates a position of a rotor of the fan motor, wherein
 the control logic circuit is switchable to one of the following states:
  a first state, in which an output of the bridge circuit is set to a high impedance state;
  a second state, in which an output of each phase of the bridge circuit is fixed in a predetermined state;
  a third state, in which an output state of each phase of the bridge circuit is switched in a predetermined order during a predetermined time interval;
  a fourth state, in which an output state of each phase of the bridge circuit is switched in a predetermined order in synchronization with the Hall signal; and
  a fifth state, in which an output of the bridge circuit is set to a high impedance state, and wherein
 when the control logic circuit gives an instruction to the drive circuit to start a rotation:
  if the fan motor substantially stops, a transition is made in order of the first state, the second state, the third state, and the fourth state;
  if the fan motor rotates at a speed lower than a predetermined rotational speed, a transition is made in order of the first state, the fifth state, the second state, the third state, and the fourth state;
  if the fan motor rotates at a speed higher than the predetermined rotational speed, a transition is made in order of the first state, the fifth state, and the fourth state.

2. The drive circuit of claim 1, wherein when the control logic circuit is in the first state, and
 when the rotational speed of the fan motor is lower than a predetermined first threshold value, a transition to the second state is made; and
 when the rotational speed of the fan motor is higher than the first threshold value, a transition to the fifth state is made.

3. The drive circuit of claim 2, wherein when the control logic circuit is in the fifth state, and
 when the rotational speed of the fan motor is higher than a second threshold value higher than the first threshold value, a transition to the fourth state is made; and
 if it is not the above situation, a transition to the second state is made.

4. The drive circuit of claim 1, wherein when the control logic circuit is in the second state and when the rotor of the fan motor is stationary at a predetermined initial position, a transition to the third state is made.

5. The drive circuit of claim 1, wherein when the control logic circuit is in the third state and when the fan motor actuates successfully, a transition to the fourth state is made.

6. The drive circuit of claim 4, wherein the control logic circuit is switchable to a sixth state of fixing the output of each phase of the bridge circuit to a same level in addition to the first state to the fifth state, and
 when the control logic circuit is in the second state and when the rotor of the fan motor does not stop at the predetermined initial position, a transition to the sixth state is made.

7. The drive circuit of claim 6, wherein when the control logic circuit is in the third state and when an actuation of the fan motor fails, a transition to the sixth state is made.

8. The drive circuit of claim 3, wherein the second threshold value is configurable externally.

9. The drive circuit of claim 8, further comprising a setting pin for receiving a setting signal indicating the second threshold value.

10. The drive circuit of claim 1, wherein when the control logic circuit is in the first state and
 when a variation of the Hall signal is not detected within a predetermined first time, a transition to the second state is made, and
 when a variation of the Hall signal is detected within the predetermined first time, a transition to the fifth state is made.

11. The drive circuit of claim 10, wherein when the control logic circuit is in the fifth state and when a period of the Hall signal is shorter than a predetermined second time, a transition to the fourth state is made, and
 when it is not the above situation, a transition to the second state is made.

12. The drive circuit of claim 1, wherein when the control logic circuit is in the second state and when the Hall signal maintains at an expected state for a third time, a transition to the third state is made.

13. The drive circuit of claim 1, wherein when the control logic circuit is in the third state and when the Hall signal satisfies a predetermined condition, a transition to the fourth state is made.

14. The drive circuit of claim 13, wherein the predetermined condition includes a first condition that an output state of the bridge circuit has been switched a predetermined number of times.

15. The drive circuit of claim 14, further including a counter electromotive force detection circuit that generates a counter electromotive force detection signal based on a counter electromotive force of the fan motor, and
 the predetermined condition includes a second condition that a phase difference between the Hall signal and the counter electromotive force detection signal is equal to or less than a predetermined value.

16. The drive circuit of claim 10, wherein besides the first state to the fifth state the control logic circuit is switchable to the sixth state of fixing the output of each phase of the bridge circuit to a same level, and
 when the control logic circuit is in the second state and when the Hall signal maintains a unexpected state for a fourth time, or when the Hall signal has been switched a predetermined number of times, a transition to the sixth state is made.

17. The drive circuit of claim 1, wherein the drive circuit is integrated on one semiconductor substrate.

18. A cooling device, comprising:
a fan motor with a sensor; and
the drive circuit of claim 1 for driving the fan motor.

19. An electronic apparatus, comprising:
a processor;
a fan motor for cooling the processor; and
the drive circuit of claim 1 for driving the fan motor.

20. A driving method, which is the driving method of a fan motor with a sensor, comprising:
generating a Hall signal indicating a position of a rotor of the fan motor;
if the fan motor substantially stops when an instruction for starting a rotation occurs, the fan motor starts through one of the following states;
a first state, in which an output of a bridge circuit connected to the fan motor is set to a high impedance state;
a second state, in which an output of each phase of the bridge circuit is fixed in a predetermined state;
a third state, in which an output state of each phase of the bridge circuit is switched in a predetermined order during a predetermined time interval; and
a fourth state, in which an output state of each phase of the bridge circuit is switched in a predetermined order in synchronization with the Hall signal, wherein
when an instruction for starting a rotation occurs, if the fan motor rotates at a speed lower than a predetermined rotational speed, a step for activating the fan motor is performed by transition in order of the first state, a fifth state in which an output of the bridge circuit is set to a high impedance state, the second state, the third state, and the fourth state, and
when an instruction for starting a rotation occurs, if the fan motor rotates at a speed higher than the predetermined rotational speed, a step for activating the fan motor is performed by transition in order of the first state, the fifth state, and the fourth state.

* * * * *